(12) United States Patent
Petrik

(10) Patent No.: US 7,128,881 B2
(45) Date of Patent: Oct. 31, 2006

(54) CONFIGURATIONS AND METHODS FOR WATER PURIFICATION

(76) Inventor: Viktor I. Petrik, pr. Energetikov 35-1-6, St. Petersburg (RU) 195248

( * ) Notice: Subject to any disclaimer, the term of this patent is extended or adjusted under 35 U.S.C. 154(b) by 365 days.

(21) Appl. No.: 10/837,472

(22) Filed: Apr. 30, 2004

(65) Prior Publication Data

US 2005/0244313 A1    Nov. 3, 2005

(51) Int. Cl.
*B01D 50/00* (2006.01)

(52) U.S. Cl. ............... 422/168; 96/202; 502/183; 502/184; 502/185; 502/182; 423/445

(58) Field of Classification Search ............. 210/749; 96/202; 502/182–185; 422/168; 423/445
See application file for complete search history.

(56) References Cited

U.S. PATENT DOCUMENTS

| | | |
|---|---|---|
| 4,892,664 A | 1/1990 | Miller |
| 5,009,872 A | 4/1991 | Chuang et al. |
| 5,171,334 A | 12/1992 | Kabis |
| 5,180,503 A | 1/1993 | Gorelick et al. |
| 5,190,668 A | 3/1993 | Chuang |
| 5,198,000 A | 3/1993 | Grasso et al. |
| 5,332,563 A | 7/1994 | Chang |
| 5,389,267 A | 2/1995 | Gorelick et al. |
| 5,531,865 A | 7/1996 | Cole |
| 5,609,829 A | 3/1997 | Lucas et al. |
| 5,637,198 A | 6/1997 | Breault |
| 5,714,379 A | 2/1998 | Phipps, Jr. |
| 5,814,132 A | 9/1998 | Grime et al. |
| 5,851,948 A | 12/1998 | Chuang et al. |
| 5,914,091 A | 6/1999 | Holst et al. |
| 5,928,409 A * | 7/1999 | Sirkar ............... 95/45 |
| 5,954,966 A | 9/1999 | Matsuura et al. |
| 6,117,335 A | 9/2000 | Bender |
| 6,165,253 A | 12/2000 | Sirkar et al. |
| 6,193,504 B1 | 2/2001 | Chen et al. |
| 6,194,197 B1 | 2/2001 | Hyman et al. |
| 6,197,206 B1 | 3/2001 | Wasinger |
| 6,200,466 B1 | 3/2001 | Bender |
| 6,365,397 B1 | 4/2002 | Salanitro |
| 6,458,741 B1 | 10/2002 | Roark et al. |
| 6,479,022 B1 | 11/2002 | Campbell et al. |
| 6,617,588 B1 | 9/2003 | Sato |
| 6,713,519 B1 * | 3/2004 | Wang et al. ............ 518/715 |
| 2002/0144953 A1 | 10/2002 | Kerfoot |
| 2003/0094099 A1 | 5/2003 | Lin et al. |
| 2003/0129735 A1 | 7/2003 | Moorhead |

FOREIGN PATENT DOCUMENTS

| | | |
|---|---|---|
| EP | 0822004 | 2/1998 |
| WO | WO 01/45833 | 12/2000 |
| WO | WO 03/062153 | 1/2003 |

* cited by examiner

*Primary Examiner*—Glenn Caldarola
*Assistant Examiner*—Alexis Wachtel
(74) *Attorney, Agent, or Firm*—Rutan & Tucker, LLP

(57) ABSTRACT

Volatile organic compounds are removed from a liquid and destroyed using a device in which an air stripper having alternating phases of hydrophilic and hydrophobic packing materials promotes transition of the VOC from the liquid phase into the gas phase, and wherein the is oxidized VOC in the gas phase on a hydrophobic carbon nanostructure that further comprises a catalytically active metal.

10 Claims, 1 Drawing Sheet

CONFIGURATIONS AND METHODS FOR WATER PURIFICATION

FIELD OF THE INVENTION

Configurations and methods for removal of contaminants, especially as they relate to removal and destruction of volatile organic compounds from various sources, and particularly MTBE (methyl tert-butyl ether, or 2-methyl-2-methoxypropane) from water.

BACKGROUND OF THE INVENTION

Volatile organic compounds (VOCs) have been used for decades in many industrial processes. For example, various VOCs are frequently used as building block for chemical syntheses, as solvents, or lubricants. In still other uses of particular VOCs, MTBE is used as fuel oxygenate in gasoline to reduce carbon monoxide emissions. Annual production of MTBE in the EU was reported to about 3 million tones, with even higher annual production in the U.S.

Unfortunately, MTBE and other VOCs (e.g., benzene, toluene, ethyl benzene, xylene) have recently been found in groundwater in the U.S. and other countries as a result of direct or indirect discharge into the soil, atmosphere, and/or groundwater. Among other routes, VOCs reach the groundwater via incomplete combustion from automobile engines, surface spills or leaks of fuel, leaking underground fuel tanks and piping systems. The U.S. Environmental Protection Agency has tentatively classified MTBE as a possible human carcinogen, and the California EPA Office of Environmental Health Hazard Assessment (OEHHA) established an interim action level of 35 ppb for MTBE. The importance of MTBE removal is further compounded by the fact that MTBE is relatively inert to biodegradation in most soils and/or aquifers. Presently, it is estimated that over 1600 groundwater wells in more than 39 states in the U.S. have substantial levels of MTBE contamination, and additional wells with significant MTBE levels have recently been reported in Canada.

There are numerous configurations and methods for VOC removal and/or destruction known in the art. For example, VOCs can be selectively removed from a source stream using membrane filtration as described in U.S. Pat. No. 5,954,966 to Matsuura et al. However, such systems often fail to provide an economically attractive solution, as membrane manufacture is relatively complex. Furthermore, and especially compared with air stripping, the filtration rate using such membranes is relatively low. Alternatively, VOCs may be removed from a source using adsorption to a solid material, and typical processes are described in WO 2003/062153 to Mirzayi et al. (using activated charcoal), U.S. Pat. No. 5,814,132 to Grime et al. (using coated aluminosilicates), or European App. No. 0822004 (using an organic polymer). While such solid adsorbents are generally inexpensive, simple to use, and provide relatively high flow rates, various disadvantages remain. Among other things, various VOCs (and especially MTBE) adsorb only poorly to activated charcoal. Moreover, the sorbent typically requires separate regeneration or disposal, thus shifting the MTBE problem merely to another locale.

Similarly, solvents can be employed to remove VOCs from a source material, and numerous solvent-based processes are described in the art. For example, U.S. patent application Ser. No. 2003/0094099 to Lin et al. employs water as a solvent, and the VOCs are then treated with ozone or peroxide. Alternatively, as described in U.S. Pat. No. 6,165,253 to Sirkar et al., a paraffinic oil or synthetic hydrocarbon solvent is employed to absorb the VOC, while Grasso et al. teach in U.S. Pat. No. 5,198,000, use of motor oil, mineral oil, or corn oil as an absorbent. However, the energy costs of most solvent processes are relatively high due to the circulation pumps and solvent heaters in the regeneration process.

In further known processes, air stripping is employed to drive the VOC from water into a gas phase. Air stripping can be performed in situ in soil as described in U.S. patent application Ser. No. 2002/0144953 to Kerfoot, using micro bubbles, or in U.S. Pat. Nos. 5,389,267 and 5,180,503 to Gorelick, using gas lift pumping. Air stripping may also be performed in stripping vessels or columns as described in U.S. Pat. No. 5,171,334 to Kabis. While air stripping is a relatively simple process, the liberated MTBE must be captured and destroyed, which is often problematic in in situ applications.

Once isolated from a source (e.g., air or water), the VOCs can be destroyed using various methods well known in the art. For example, in one approach, MTBE and other VOCs are transformed into less toxic compounds using microorganisms as described in U.S. Pat. No. 6,365,397 to Salanitro, U.S. Pat. No. 6,194,197 to Hyman et al., U.S. Pat. No. 5,714,379 to Phipps Jr., or in U.S. patent application Ser. No. 2003/0129735 to Moorhead. Biological transformation of VOCs is often desirable, as little or no equipment is needed to clean up a contaminated site. However, biotransformations are often relatively slow. Moreover, where relatively toxic additional contaminants are present, microorganisms may not be viable for a sufficient time to degrade the VOC to the desired extent.

In another approach, MTBE and other VOCs can be photolytically destroyed as described in U.S. Pat. Nos. 6,117,335 and 6,200,466 to Bender using near blackbody radiation. In further examples of photolytic destruction, UV irradiation and supplemental ultrasound energy is used to destroy VOCs as taught by Sato in U.S. Pat. No. 6,617,588. While photolytic destruction is often relatively effective, various disadvantages remain. Among other problems, large quantities of water are often impractical to treat as water absorbs UV relatively strongly. Furthermore, to ensure substantially complete VOC destruction, the relatively high-energy demand often renders such technology uneconomical.

In a still further approach, VOCs may be electrolytically destroyed either via direct oxidation at the anode, or indirectly via generation of oxidizing species in the electrolytic cell. For example, Cole teaches in U.S. Pat. No. 5,531,865 the use of sacrificial electrodes, while Breault teaches in U.S. Pat. No. 5,637,198 use of corona discharge. Such methods are generally effective in VOC destruction, however, suffer from similar problems as photolytic methods. Most significantly, the energy demand is often undesirably high. To circumvent at least some of the problems associated with energy demand, VOCs can be contacted with oxidizing species as taught by Wasinger in U.S. Pat. No. 6,197,206 or U.S. patent application Ser. No. 2002/0144953 to Kerfoot. In further known oxidative processes, molten yellow phosphorus may be employed as an oxidant as described in U.S. Pat. No. 5,332,563. Such processes are conceptually simple, however, typically require exact dosing or post-treatment steps where over-oxidation or residual oxidant in the water is undesirable.

In most preferred methods, MTBE and other VOCs are catalytically oxidized using various catalysts. For example, Taylor et al. use uranium oxide to catalytically destroy various VOCs. In other examples, as described in U.S. Pat. No. 6,193,504 to Chen, U.S. Pat. No. 5,914,091 to Holst et al., or U.S. Pat. No. 5,609,829 to Lucas et al., platinum, manganese, or copper are used on a ceramic material to form a catalyst that assists in VOC oxidation. Suitable catalysts may also be admixed with a VOC adsorbent as taught by Campbell et al. in U.S. Pat. No. 6,479,022. While the use of catalysts typically significantly reduces energy requirements as compared to many electrolytic or photolytic methods, most of the known catalysts still require relatively high temperature for proper operation. To reduce temperature requirements, mixed metal oxide or multi-phase catalysts can be employed as described in WO 01/45833 or U.S. Pat. No. 6,458,741 to Roark et al., or in U.S. Pat. Nos. 5,851,948 and 5,009,872 to Chuang et al.

Such low-temperature catalyst in combination with air stripping typically provides technologically simple and effective systems for VOC removal and destruction. For example, in U.S. Pat. No. 5,190,668 to Chuang, the inventor describes a process in which VOCs are stripped from a liquid and oxidized using a noble metal oxidation catalyst that is deposited on a hydrophobic support. A similar system using certain precious metal catalysts is described in U.S. Pat. No. 4,892,664 to Miller, and further suitable catalysts are described. Such systems generally provide various advantages over other systems described above. However, energy consumption and flow rate are often still less than desirable. Moreover, and particularly where noble metals are employed, the cost of such catalysts frequently reduces the economic attractiveness.

Therefore, while numerous configurations and processes for water purification are known in the art, all or almost all of them, suffer from one or more disadvantages. Thus, there is still a need for improved water purification plants and methods, and especially for removal and destruction of MTBE from water.

SUMMARY OF THE INVENTION

The present invention is directed to configurations and methods of separation of volatile organic compounds from a medium, and most preferably water, using air stripping devices with alternating hydrophilic and hydrophobic phases, and destruction of the volatile organic compounds, preferably in gas phase, using a hydrophobic carbon nanostructure catalyst.

In one aspect of the inventive subject matter, a purification device for removal of a volatile organic compound from water comprises a stripping unit having alternating phases of hydrophobic packing material and hydrophilic packing material, wherein the volatile organic compound passes from a liquid phase into a gas phase within the stripping unit. Contemplated devices further include a catalytic oxidation unit that is fluidly coupled to the stripping unit to receive at least part of the gas phase, wherein the oxidation unit includes a catalyst that comprises a hydrophobic carbon nanostructure onto which a catalytically active metal is deposited and that catalyzes oxidation of the volatile organic compound to a degradation product.

In another aspect of the inventive subject matter, an air stripper for stripping a volatile organic compound from a liquid comprises alternating phases of hydrophilic packing material and hydrophobic packing material, wherein the volatile organic compound passes from the liquid to a gas phase, and wherein the hydrophobic packing material comprises a transition state metal or a hydrophobic carbon nanostructure.

In a further aspect of the inventive subject matter, a catalytic oxidation unit comprises a hydrophobic carbon nanostructure onto which a catalytically active metal is deposited in an amount of between 0.01 wt % and 0.4 wt %, in which the metal has a thickness of less than 0.1 micrometer, and wherein the catalyst catalyzes oxidation of a volatile organic compound at a temperature of less than 200° C.

Particularly preferred packing materials are fabricated from stainless steel wire and have a coil shape. In further particularly preferred aspects, the hydrophilic packing material has a surface that comprises a metal oxide film, most preferably with a thickness of between 50 nanometers and 70 nanometers, while the hydrophobic packing material has a surface that comprises a transition state metal (preferably a group IV metal) or a hydrophobic carbon nanostructure (optionally comprising a metal or transition state metal).

With respect to the catalyst, it is especially preferred that the catalyst comprises a hydrophobic carbon nanostructure onto which a catalytically active metal (e.g., platinum or silver) is deposited. In particularly preferred aspects, the platinum or silver is present in an amount of between 0.01 wt % and 0.4 wt %, and has a thickness of less than 0.1 micrometer.

Various objects, features, aspects and advantages of the present invention will become more apparent from the following detailed description of preferred embodiments of the invention.

DETAILED DESCRIPTION

Figure 1:
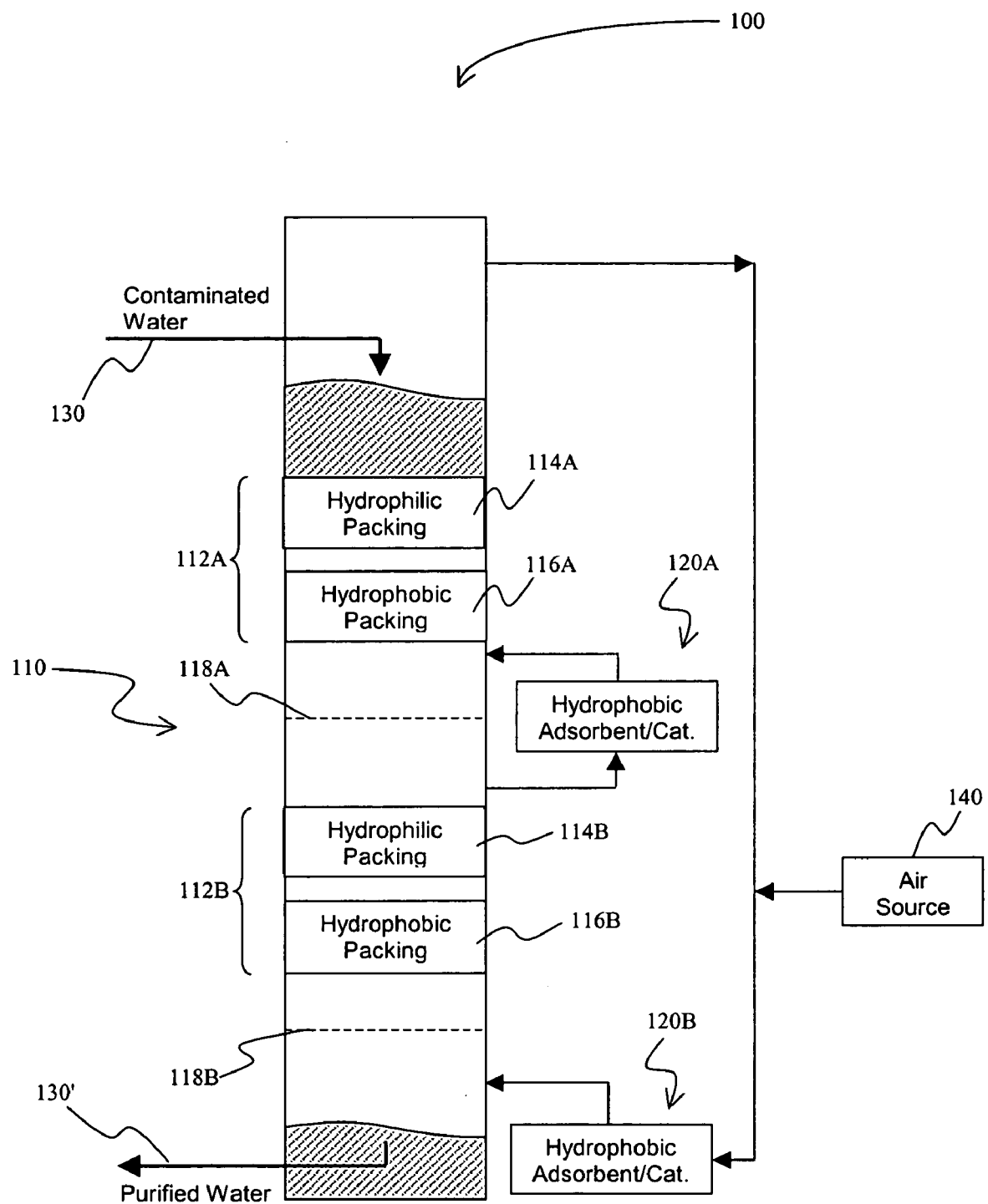
FIG. 1 is an exemplary schematic configuration of a water purification device according to the inventive subject matter.

The inventors have discovered that VOCs and especially MTBE can be removed from an aqueous solution (e.g., contaminated well or drinking water) and oxidized with surprising efficacy where a process employs a counter-current air stripping process in which alternating layers of hydrophilic and hydrophobic packing materials promote transition of the VOC from the aqueous to the gaseous phase. The VOCs are then oxidized at low temperatures using a hydrophobic carbon nanostructure onto which a catalytically active metal is deposited. In preferred aspects, contemplated configurations can advantageously be used in fully enclosed devices that produce sub-ppb VOC emission, or even no vapor emission. In most cases, VOC oxidation products are carbon dioxide and water, both of which are typically dissolved in the purified water to a large extent.

In one exemplary configuration, as depicted in FIG. 1, a purification device 100 for removal of a volatile organic compound from an aqueous medium includes a stripping unit 110 and catalytic oxidation units 120A and 120B. Contaminated water 130 (typically water with an MTBE concentration of more then 25 ppb) enters the top of the stripping unit 110 and passes in a downward flow (typically by gravity, optionally under pressure) through the first separation section 112A having a section with hydrophilic packing material 114A and a section with hydrophobic packing material 116A. At least a portion of the VOC from the contaminated aqueous medium passes in the gas phase, and the at least partially purified aqueous medium passes though tray 118A downwards to the second separation section 112B having a section with hydrophilic packing material 114B and a section with hydrophobic packing material 116B. After passage through 116B, the VOC is now substantially completely (i.e., greater than 95%, more typically greater than 98%, most typically greater than 99%) in the gas phase, and the treated water 130' leaves the stripping unit 110.

The counter-current gas flow is typically driven by an air source 140 (e.g., pump, booster, or source of compressed air) that preferably provides the gas phase and the oxygen for the catalytic reaction in the catalytic oxidation units 120A and 120B. As the air enters the stripping unit 110 at a lower end, the gas phase moves upwardly through tray 118B and the second separation section 112B. The gas phase is now enriched with VOCs and routed through the catalytic oxidation unit 120A in which the VOCs are oxidized to less toxic products, typically including water and CO2. The so generated VOC depleted stream is fed back into the stripping unit 110 and further passes upwardly through first separation section 112A. Once more, the gas phase is now enriched with VOCs and routed through catalytic oxidation unit 120B in which the VOCs are oxidized to less toxic products, typically including water and CO2. The so regenerated gas phase again enters the stripping column 110. As needed, treated gas can be vented and/or supplemented with fresh air (or oxygen). Of course, it should be recognized that numerous modifications can be made to the exemplary configuration according to FIG. 1, and preferred components and their alternatives are described below.

VOC-Solvent Separation

It is generally preferred that the separation of the VOC from the aqueous phase into the gas phase is performed using alternating layers of hydrophobic packing material and hydrophilic packing material. Such configurations have consistently and surprisingly shown a high degree (e.g., equal or greater than 99%) of MTBE extraction (and other VOC) from water. While not wishing to be bound by any theory or hypothesis, the inventors contemplate that such high efficiency is achieved by maximizing the mass transfer coefficient at conditions that minimize transversal and longitudinal mixing and produce only insignificant hydraulic resistance. Using the above design considerations, the size, geometric shape, and surface properties of the packing material (e.g., chemical composition of material, wetability, surface texture) were determined by various computational simulations and experiments (data not shown). In most preferred aspects, the packing material has an irregular wire-coil shape that rapidly establishes vapor equilibration of the VOCs (and especially MTBE).

With respect to shape and size of the packing material, it is generally preferred that the mass transfer of the VOC from the liquid phase to the gas phase, and from the gas phase onto the adsorbent-catalyst surface proceeds under a turbulent diffusion condition, which allows for high throughput velocities at all purification stages. Thus, numerous shapes and sizes are deemed suitable. However, most preferably, the packing material is formed from metal wire coils in which the wire has a diameter of less than 1 mm, more typically less than 0.5 mm, and most typically between 0.2 and 0.3 mm. The wire coils will preferably have a length of between about 5 mm and 5 cm, with an outer diameter of between about 3 mm and 2 cm, however, other lengths and diameters are also considered suitable herein. Preferred materials for the packing material include various metals, and particularly metal alloys. Among other materials, steel, and most typically stainless steel is especially preferred. It should be recognized that the hydrophilic packing material contemplated herein is typically non-catalytic with respect to an oxidation reaction between oxygen and the VOCs/MTBE at room temperature and atmospheric pressure. However, in at least some of the contemplated aspects, and especially where the hydrophobic packing material is coated with a hydrophobic carbon nanostructure onto which a metal is deposited (and particularly where the metal is catalytically active), the hydrophobic packing material may also be a catalytically active material (which may or may not catalyze oxidation of the VOC).

Hydrophilic surface properties can be established on the packing material in numerous manners, and all of the known manners are deemed appropriate for use herein. For example, suitable methods for imparting hydrophilicity include coating with a hydrophilic material, and/or modification of the packing material surface to create a hydrophilic surface. However, and especially where the packing material comprises steel or stainless steel, it is especially preferred that the hydrophilic packing material is prepared by formation of an oxide film.

There are numerous methods of oxide film formation known in the art, and all of those are considered suitable for use herein. For example, stainless steel may be oxidized at elevated temperatures (e.g., 300° C.) in dry air at normal gas pressure, or in dry steam, wet steam, or in high purity water (0.05 mS/cm) at elevated pressure (e.g., 90 bar) for various times (typically between times from 0.5 h up to 120 days). Alternatively, oxidizing acids may be employed and particularly preferred acids include chromosulfuric acid, sulfuric acid, and nitric acid.

Depending on duration and oxidation conditions, it should be recognized that the oxidation layer may vary considerably with respect to thickness and qualitative composition. However, the preferred thickness of the oxide layer is less than 500 nm, more preferably less than 200 nm, even more preferably less than 100 nm, and most preferably between 50 and 70 nm. With respect to the chemical composition, it should be recognized that the composition will depend at least in part on the manner of oxide film formation. For example, during oxidation in dry air, a two-layered oxide film is typically formed, wherein the outer oxide layer consists nearly exclusively of iron oxides, while oxides of chromium, nickel, and molybdenum are typically found in the inner layer. In the presence of water, an enhanced oxide layer formation is often observed (e.g., factor 5 for dry steam, factor 10 for wet steam and pure water). In such preparations, chromium and nickel may be present at the metal surface as oxides.

In another approach of forming oxides, a typical passivation procedure may be used in which the surface is first vapor degreased, cleaned with a solvent, and soaked in an alkaline solution. The so prepared metal is then immersed in nitric acid (or other oxidizing acid) for a desired period (e.g., between 20 min and two hours) at a temperature of between about room temperature and 60° C. The nitric acid concentration is often in the range of 20-vol % to 50 vol %. Sodium dichromate may be added where desirable.

Hydrophobic surface properties can be established on the packing material in numerous manners, and all of the known manners are deemed appropriate for use herein. For example, suitable methods for imparting hydrophobicity include coating with a hydrophobic material, and/or modification of the packing material surface to create a hydrophobic surface. However, and especially where the packing material comprises steel or stainless steel, it is especially preferred that the hydrophobic packing material is prepared by formation of an oxide film, which is followed by modification of at least part of the oxide layer with a hydrophobic composition. With respect to the oxide layer, the same considerations as provided above apply.

Especially preferred manners of modification of an oxide layer to form a hydrophobic coating include those in which the oxide film is contacted with emulsion or dispersion containing transition metals and/or their oxides. For example, titanium oxide is a known hydrophobic material and may deposited from solution or from a titanium chelate preparation, which is subsequently decomposed to thus deposit a titanium oxide film on the surface. Typically, packing material with an oxide film is first immersed in an aqueous solution of a titanium chelate. Then, the titanium chelate is decomposed (e.g., using acid, base, or heat) to form the titanium as a titanium oxide film (typically as oxyhydroxide), on the substrate. Alternatively, titanium oxide may be deposited via vapor or vacuum deposition, or via plasma deposition or sputtering (followed by controlled oxidation where appropriate).

While group IV transition metals and their oxides (e.g., zirconium oxide or titanium oxide) are particularly preferred as hydrophobic coating, alternative hydrophobic materials are also deemed suitable and include various silane and silicon nitride compounds. Alternatively, organic hydrophobic coatings may be included to impart hydrophobicity, and suitable organic coatings include hydrophobic carbon nanostructures, preferably having a surface area of more than 200 $m^2$/per gram, more preferably more than 500 $m^2$/per gram, and most preferably equal to or more than 800 $m^2$/per gram. Exemplary synthesis of such structures include those described in U.S. Pat. No. 6,713,519 to Wang et al. or U.S. patent application Ser. No. 2003/0024884 to Petrik, both of which are incorporated by reference herein. Additionally, contemplated hydrophobic carbon nanostructures may further be coated with one or more metals. Thus, contemplated hydrophobic materials may also be hydrophobic catalysts as described below. Further contemplated hydrophobic coatings include hydrophobic polymers such as halogenated and non-halogenated polyethylene, polyurethane, polyvinyl, and polystyrene. Alternatively, hydrophobic properties may be imparted by coating the coils with silicon-containing compounds (e.g., organosilanes, etc.).

In still further contemplated alternative aspects, the hydrophilic and/or hydrophobic properties may be imparted onto numerous materials other than steel or stainless steel, and contemplated materials include minerals and their oxides (e.g., alumina, silicates, etc.), organic polymers, and metals and metal alloys. In such embodiments, it should be appreciated that the hydrophilic and/or hydrophobic coatings may be applied using all known methods and compositions.

Moreover, while it is generally preferred that the hydrophilic packing material and the hydrophobic packing material are arranged in alternating layers (i.e., at least one hydrophobic layer of packing materials is upstream and/or downstream of a hydrophilic layer of packing material), it should also be appreciated that alternating phases may be arranged in volumes or sequences other than flat layers. For example, suitable alternative alternating arrangements include random arrangements of hydrophobic and hydrophilic packing materials, or random, or ordered arrangements (e.g., mosaic-like) of packing material volumes, so long as at least one hydrophilic packing material (volume or layer) is upstream and/or downstream of one hydrophobic packing material (volume or layer).

Catalytic Oxidation

While not limiting to the inventive subject matter, it is generally contemplated that the separation of VOCs and especially MTBE from water may be further assisted by VOC/MTBE adsorption from the gas phase to the catalyst, and especially where the catalyst is hydrophobic and/or porous. In preferred aspects, the catalyst includes a hydrophobic carbon nanostructure onto which a catalytically active metal (e.g., noble metal, platinum, or silver) is deposited. As used herein, the term "carbon nanostructure" herein refers to any structure formed from a plurality of carbon atoms that forms a structural element (e.g., sphere, tube, bowl, etc.) with a nanosized dimension (i.e., a dimension [e.g., diameter, length, etc.] of less than 1 micrometer, more typically less than 500 nm, and most typically less than 200 nm).

In preferred embodiments of the inventive subject matter, the catalyst is a hydrophobic material or comprises a hydrophobic coating to avoid adsorption of the VOCs/MTBE by a water film coupled to the catalyst. Thus, it is contemplated that the hydrophobic catalyst will not be wetted by nor will it allow condensation of water to the catalyst, and the selective adsorption of VOCs/MTBE therefore will proceed with high velocity and good selectivity. It should further be recognized that the hydrophobic carbon nanostructure also includes a catalytically active metal (preferably silver or platinum) that catalyses oxidation of the VOC or MTBE to thereby regenerate the catalyst.

With respect to the catalyst, it is preferred that in some aspects of the inventive subject matter the catalyst comprises a porous organic fluorine-containing polymer. For example, suitable polymers include TEFLON™ (polytetrafluoroethylene), KYNAR™ (polyvinylidene fluoride), or various tetrafluoroethylene-hexafluoropropylene copolymers. However, in other aspects of the inventive subject matter, numerous other hydrophobic materials are suitable, and especially include silicon-containing hydrophobic materials. Contemplated catalysts may also be prepared from metals (which may or may not include a metal oxide coating). It is still further contemplated that the catalysts may be porous, and all pore sizes are deemed suitable for use herein.

Regardless of the base material for contemplated catalysts, it is typically preferred that the catalyst includes a hydrophobic carbon nanostructure onto which a catalytically active metal is deposited. Synthesis of such structures is well known in the art (see e.g., Wang et al or Petrik et al., supra), and it should further be recognized that suitable hydrophobic carbon nanostructure may be employed without a carrier or coupled to a carrier (e.g., compacted, embedded, covalently coupled, ionically coupled, etc.). In yet another preferred aspect of the inventive subject matter, it should be recognized that one or more catalytically active metals are deposited onto the hydrophobic carbon nanostructure.

Suitable catalytically active metals preferably include one or more transition metals, and most preferably a transition metal in groups IX–XI (particularly those chosen from the $4^{th}$ to $6^{th}$ period). For example, in particularly preferred aspects, the catalytically active metal is platinum, silver, or a mixture thereof. Alternatively, or additionally, titanium, vanadium, chromium, cobalt, copper iron, molybdenum, and/or manganese may also be employed. Still further contemplated catalytically active metals may be in the form of the respective metal oxides, and mixtures thereof (metal/metal, metal/metal oxide, and metal oxide/metal oxide). With respect to the amount of contemplated catalytically active metals, it is preferred that the catalytically active metal is present between about 0.01 wt % and 0.4 wt %, however, higher amounts (e.g., between 0.4 wt % and 4 wt %, and less preferably between 4 wt % and 20 wt %) are also deemed suitable. Similarly, lower quantities of catalytically active metals are also contemplated, and especially where the VOC/MTBE concentration is relatively low.

In further especially preferred aspects of the inventive subject matter, the catalytically active metal has a crystalline structure (typically cubic close-packed), which may be ordered or amorphous crystals. Particularly preferred crystals have a grain size between about 1 nm to about 5 nm. The term "about" as used herein and when used in conjunction with a numeral refers to a range of +/−10% of that numeral, inclusive. However, larger crystal structures are not expressly excluded. Furthermore, where the catalytically active metal is deposited in a film or otherwise thin layer, it is preferred that such layers have a thickness of less than 1000 nm, more preferably less than 500 nm, even more preferably less than 100 nm, and most preferably less than 10 nm. Consequently, it should be recognized that the catalytically active metal can be deposited via chemical vapor deposition, pyrolytic metal deposition, sputtering, or plasma deposition. However, all other methods of metal deposition onto a surface are also deemed suitable, including precipitation from a solvent or complex, coating from a solution or dispersion, electrodeposition, electroless plating, etc.

With respect to the shape of contemplated adsorbent catalysts, it should be recognized that the particular shape is not critical. However, the shape of adsorbent catalysts is preferably such that the pressure drop across the catalytic oxidation unit is relatively small. Therefore, suitable shapes include honeycomb structures, beads, and coils. It should also be appreciated that the size of the adsorbent catalysts will at least in part depend on the volume flow through the oxidation unit. Typically, where non-flow through structures (e.g., non-honeycomb-type contactors) are employed, suitable sizes will be in the range of one to several millimeters to several centimeters, and even more.

EXAMPLE

A water purification device was constructed using a first cylindrical column with an inside diameter of 150 mm and a height of 1,166 mm. One layer of hydrophilic packing material was disposed above and separated via a porous tray by an airspace (with the capacity to carry a water-air mixture) from one layer of hydrophobic column packing material. A bladder tank was connected and used to maintain constant pressure and flow of MTBE contaminated water (MTBE at about 200 ppb) into an upper section of the first column above the hydrophilic material, and a pump provided continuous gravity feed of the contaminated water. Treated water left the first column at a lower portion at a position below the hydrophobic packing material.

A second column with an inside diameter of 45 mm and a height of 700 mm was packed with a catalyst that comprised a hydrophobic carbon nanostructure and connected such that the second column received the gas phase from the first column, wherein the gas phase was retrieved from the first column at a position above the point where the contaminated water was fed to the first column. The second column was heated by an electric heater (capacity of 160 W) to an inside temperature of between about 100–150° C., and a temperature controller maintained constant temperature of the hydrophobic catalyst. The gas phase left the second column opposite to the feed end such that the gas phase passed at least once through the adsorbent catalyst. The so treated gas phase was introduced into a lower section of the first column above the position where the treated water was withdrawn from the first column. Ambient air was supplied and circulated by an air blower that was coupled to the gas circuit at a position upstream of the second column.

A total of 18 liters of hydrophobic packing material and hydrophilic packing material was employed, with about 12 liters of hydrophobic packing material and about 6 liters of hydrophilic packing material. Both packing materials were formed from stainless steel as wire coils with dimensions of about 5 mm (height)×0.25 mm (diameter). Hydrophilic material was produced by surface oxidation to form a 50 nm thick film of oxides, and the hydrophobic material was produced by surface oxidation to form a film of oxides, followed by coating of the material with titanium oxide, and or other coatings as described above.

The porous adsorbent catalyst was prepared by coating wire coils with a hydrophobic carbon nanostructure onto which a catalytically active metal was deposited in an amount of about 0.02 wt % platinum deposited onto the nanostructure in a thin layer of less than 100 nm. The coils had a diameter of about 5 mm and a length of about 25 mm.

Water was treated at a flow rate of about 40–100 liters per hour with a minimum of 99% decrease in concentration of MTBE (and other VOCs, fuel oxygenates, or mixtures thereof—data not shown). Consumed electricity was about 160 W per hour (excluding the water pump and air blower), and air was pumped/circulated at a rate of about 1000 liters per hour.

Therefore, the inventors contemplate a purification device for removal of a volatile organic compound from an aqueous medium, wherein the device includes a stripping unit comprising alternating phases of hydrophobic packing material and hydrophilic packing material, wherein the volatile organic compound passes from a liquid phase into a gas phase within the stripping unit. Contemplated devices further include a catalytic oxidation unit that is fluidly coupled to the stripping unit to receive at least part of the gas phase, wherein the catalytic oxidation unit further includes a catalyst that comprises a hydrophobic carbon nanostructure onto which a catalytically active metal is deposited, and wherein the catalyst catalyzes an oxidation of the volatile organic compound to a degradation product.

Particularly preferred stripping units are air strippers for stripping a volatile organic compound from a liquid, wherein the stripper has alternating phases of hydrophilic packing material and hydrophobic packing material, wherein the volatile organic compound passes from the liquid to a gas phase, and wherein the hydrophobic packing material comprises a transition state metal or a hydrophobic carbon nanostructure.

Preferred catalytic oxidation units comprise a catalyst that comprises a hydrophobic carbon nanostructure onto which a catalytically active metal is deposited in an amount of between 0.01 wt % and 0.4 wt %, in which the metal has a thickness of less than 0.1 micrometer, and wherein the catalyst catalyzes oxidation of a volatile organic compound at a temperature of less than 200° C.

Thus, specific embodiments and applications of removal of VOC from various sources, and especially of MTBE from water have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A purification device for removal and destruction of a volatile organic compound from an aqueous medium, comprising:
    a stripping unit comprising alternating phases of hydrophilic packing material and hydrophobic packing material, and wherein the volatile organic compound passes from a liquid phase into a gas phase within the stripping unit;
    a catalytic oxidation unit fluidly coupled to the stripping unit to receive at least part of the gas phase, wherein the catalytic oxidation unit further includes a catalyst that comprises a hydrophobic carbon nanostructure onto which a catalytically active metal is deposited; and
    wherein the catalyst catalyzes an oxidation of the volatile organic compound to a degradation product.

2. The purification device of claim 1 wherein at least one of the hydrophobic packing material and the hydrophilic packing material are fabricated from stainless steel wire and have a coil shape.

3. The purification device of claim 1 wherein the hydrophilic packing material has a surface that comprises a metal oxide film.

4. The purification device of claim 3 wherein the metal oxide film has a thickness of between 50 nanometers and 70 nanometers.

5. The purification device of claim 1 wherein the hydrophobic packing material has a surface that comprises a transition state metal or a hydrophobic carbon nanostructure.

6. The purification device of claim 5 wherein the transition state metal is selected from a group IV element, or wherein the hydrophobic carbon nanostructure further comprises a metal.

7. The purification device of claim 1 wherein the catalytically active metal on the hydrophobic carbon nanostructure is platinum or silver.

8. The purification device of claim 1 wherein the catalytically active metal on the hydrophobic carbon nanostructure has a thickness of less than 0.1 micrometer.

9. The purification device of claim 1 wherein the catalytically active metal is present in an amount of between 0.01 wt % and 0.4 wt %.

10. The purification device of claim 1 wherein the stripping unit and the catalytic oxidation unit are coupled to each other such that the device receives the water having more than 25 ppb of volatile organic compounds and discharges purified water having less than 10 ppb, and wherein at least a portion of the gas phase is recycled.

* * * * *